United States Patent [19]

Kaye

[11] Patent Number: 5,054,901

[45] Date of Patent: Oct. 8, 1991

[54] ADJUSTABLE BINOCULAR SPECTACLES FOR IMAGE MAGNIFICATION

[76] Inventor: Bernard Kaye, 36 The Avenue, Radlett, Hertfordshire, WD7 7DW, England

[21] Appl. No.: 475,118

[22] Filed: Feb. 5, 1990

[30] Foreign Application Priority Data

Feb. 6, 1989 [GB] United Kingdom ................. 8902589

[51] Int. Cl.⁵ .................................................. G02C 7/08
[52] U.S. Cl. ........................................ 351/41; 351/57; 351/158
[58] Field of Search ....................... 351/41, 57, 158, 59, 351/58; 350/547, 548, 549

[56] References Cited

U.S. PATENT DOCUMENTS

| 1,086,802 | 2/1914 | Beebe | 350/547 |
| 4,637,696 | 1/1987 | Wilkins | 351/41 |
| 4,810,081 | 3/1989 | Mapell et al. | 351/57 |

Primary Examiner—Rodney B. Bovernick
Attorney, Agent, or Firm—Poms, Smith, Lande & Rose

[57] ABSTRACT

A device for aiding vision of images in the mid-range, typically but not exclusively for magnifying a television picture, is provided. The device comprises a pair of spectacles comprising binocular eye-piece lenses mounted in a frame and further comprises binocular objective lenses disposed in front of each eye-piece lens and supported by an extension to the frame of the spectacles.

17 Claims, 2 Drawing Sheets

ADJUSTABLE BINOCULAR SPECTACLES FOR IMAGE MAGNIFICATION

FIELD OF THE INVENTION

This invention relates to an optical device and, more particularly but not exclusively, is concerned with double binocular-type spectacles — that is, a double lens arrangement supported by opthalmic frames derived from those used for conventional spectacles.

BACKGROUND OF INVENTION

Double binocular spectacles, per se, are known, Proposals for such devices appear in the Patent Literature, mostly of a relatively ancient date. A typical example is U.S.Pat. No. 1,562,046. This discloses double binocular spectacles whose purpose is to provide a microscopic or magnifying instrument in which an object may be viewed under considerable magnification and in the proper field of vision of both eyes at a substantially greater distance from the eyes than is possible with a simple magnifying glass such as commonly used by surgeons, watchmakers or others dealing with small objects which have to be seen magnified for proper manipulation. The double binocular spectacles thus act as a head-mounted microscope.

Various designs for similar optical devices exist. These can generally be recognised by the fact that the objective lenses (i.e. those furthest from the eyes of the wearer) are smaller than the eyepiece lenses, and are usually spaced apart from one another laterally by an amount which is less than the lateral spacing of the eyepieces. This arrangement is required in order to generate a focal point for both eyes in the close distance range. Some designs, for example that disclosed in U.S. Pat. No. 945,078 (patented 4 Jan., 1910) stressed the importance of having small objective lenses, so that these do not interfere with overall vision, whereby the user can look around freely and "do all kinds of work without the glasses interfering, or without the necessity of removing the glasses from the face, in view of the fact that it is possible to look over, under, or at the sides of the glasses".

U.S. Pat. No. 2,978,955 (patented 11 Apr., 1961) discloses a clip-on frame arrangement for providing a double binocular magnifying device.

European Patent Specification 0178014A (published 16 Apr., 1986) discloses spectacles in which the primary lenses are formed with holes designed to receive a sleeve which then contains an auxiliary lens. GB 2194646A (published 9 Mar., 1988) discloses a variety of constructions the overall result of which is essentially the same as that of EP 0178014A, in that a small central region of the eyepiece lens is provided with a magnifying attachment.

From the foregoing, it will be appreciated that the double binocular spectacles proposed hitherto have been based upon the notion that it is desirable to view small objects under magnification, but at a comfortable distance away from the eye. The binocular optical axes of such devices therefore tend to be strongly convergent.

Home entertainment has increased substantially over the last twenty years. Audience research figures show that television programs occupy a substantial proportion of most families' leisure time. It is normal for television to be watched by one or more members of a family for five or more hours per day. With the increasing popularity of home video recorders, the range and quantity of material available for home entertainment has increased dramatically. Alongside this remarkable increase in home entertainment, attendances at cinemas have declined.

SUMMARY OF THE INVENTION

An object of the present invention is to provide an optical device which may be used inter alia while wathcing television and which magnifies the image perceived by the eye. The optical device is thus intended to magnify an object in the middle distance range, typically 5-20 feet, and thereby give enhanced enjoyment to the user. It is hoped that, by means of the present invention, some of the excitement associated with the "big screen" may be appreciated in the home by television viewers.

While described generally above in relation to watching television, it will be appreciated that an optical device in accordance with the present invention is not restricted to such use.

According to the present invention, there is provided a device for aiding the vision of images in the mid-range, typically but not exclusively for magnifying a television picture, which device comprises a pair of spectacles comprising an eyepiece lens or binocular eyepiece lenses mounted in a frame and further comprising an objective lens or binocular objective lenses disposed in front of the eyepiece or each eyepiece lens and supported by an extension to the frame of the spectacles.

In order to be effective in the mid-range, the objective lens or lenses of a device in accordance with this invention should not be smaller in physical dimensions than the eyepiece lens(es). Preferably, the objective lense(es) are larger than the eyepiece lens(es).

In order to permit adjustment for viewing at different distances, the objective lens(es) are preferably mounted so as to be movable backwards and forwards along the optical axis. With binocular lenses, lateral movement of the lenses is also preferably accommodated within an optical device of this invention. Furthermore, in one embodiment, the objective lens(es) may be tilted with respect to the eyepiece lens(es), for example by pivotal motion about a generally horizontal axis. While such pivotal movement may take the objective lens(es) out of a plane normal to the optical axis of the eyepiece lens(es), thereby giving some image distortion, such pivotal movement may be helpful in allowing users to adopt a more comfortable posture while viewing television.

In one embodiment of the present invention, one or both of the eyepiece and objective lens arrangements (preferably both) is of unitary construction rather than binocular construction. In this modification, the eyepiece and/or objective lens units may have a "wrap around" configuration.

The eyepiece lens unit or lenses are advantageously bi-concave or plano-concave lenses. The objective lens unit or lenses are advantageously bi-convex or plano-convex lenses.

An optical device in accordance with this invention is not essentially concerned with correction of defects in the vision of the wearer. Thus the eyepiece lens and the objective lens for each eye will generally be identical. Nevertheless, the eyepiece lenses may be modified if desired so as to correct defects in the vision of the wearer.

For a better understanding of the invention, and to show how the same may be carried into effect, reference will now be made, by way of example, to the accompanying drawings.

DETAILED DESCRIPTION OF PREFERRED EMBODIMENTS

Figure 1:
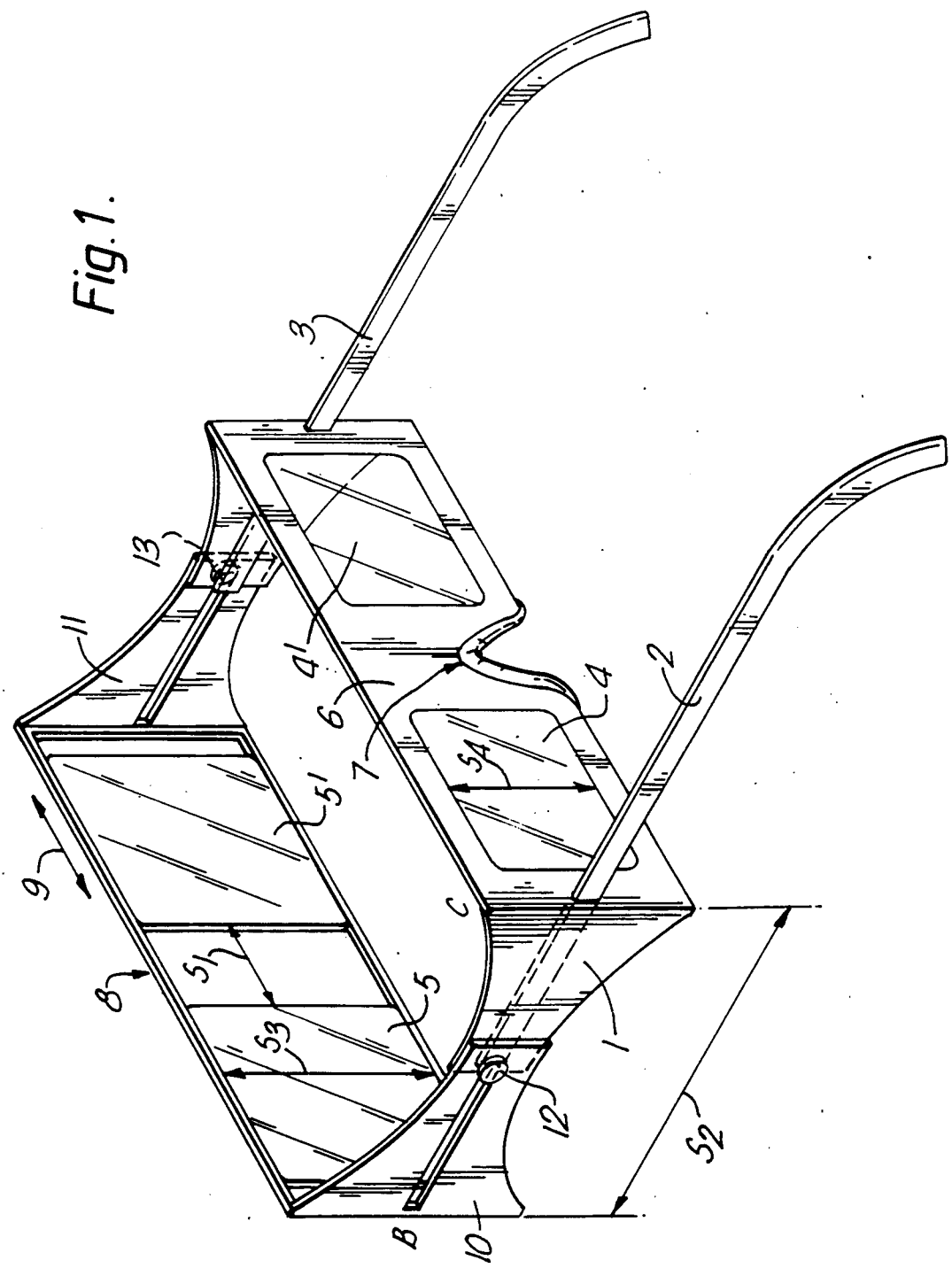
FIG. 1 illustrates a perspective view of a first embodiment in accordance with the invention.

Referring now to the drawings, the opitcal device of this invention comprises a frame indicated generally at 1 which includes side pieces 2 and 3 and which carries eyepiece lenses 4 and 4' and objective lenses 5 and 5'. In FIG. 1, lenses 4 and 4' are mounted in a support unit 6 which is shaped, at 7, to provide a nose bridge. Objective lenses 5 and 5' are located in a support unit 8. By adoption of suitable mechanical arrangements, lenses 5 and 5' may be moved in the direction of the double arrow 9 so as to increase or decrease the value of the distance $S_1$. Similarly, means are provided in side pieces 10 and 11 whereby the distance $S_2$ (the spacing between objective lenses and eye piece lenses along the optical axis) may be varied. Typically, the distance $S_2$ will be within the range from 1.5–10 cms, preferably from 2–6, and most preferably from 2.5 to 5 cms. The range of adjustment in the value of the distance $S_2$ is preferably at least 2 cms.

The mechanical linkage between objective lenses 5 and 5' and eyepiece 4 and 4' also includes pivot points 12 and 13 whereby support unit 8 may be pivoted about the notional pivot axis connecting points 12 and 13.

Figure 2:
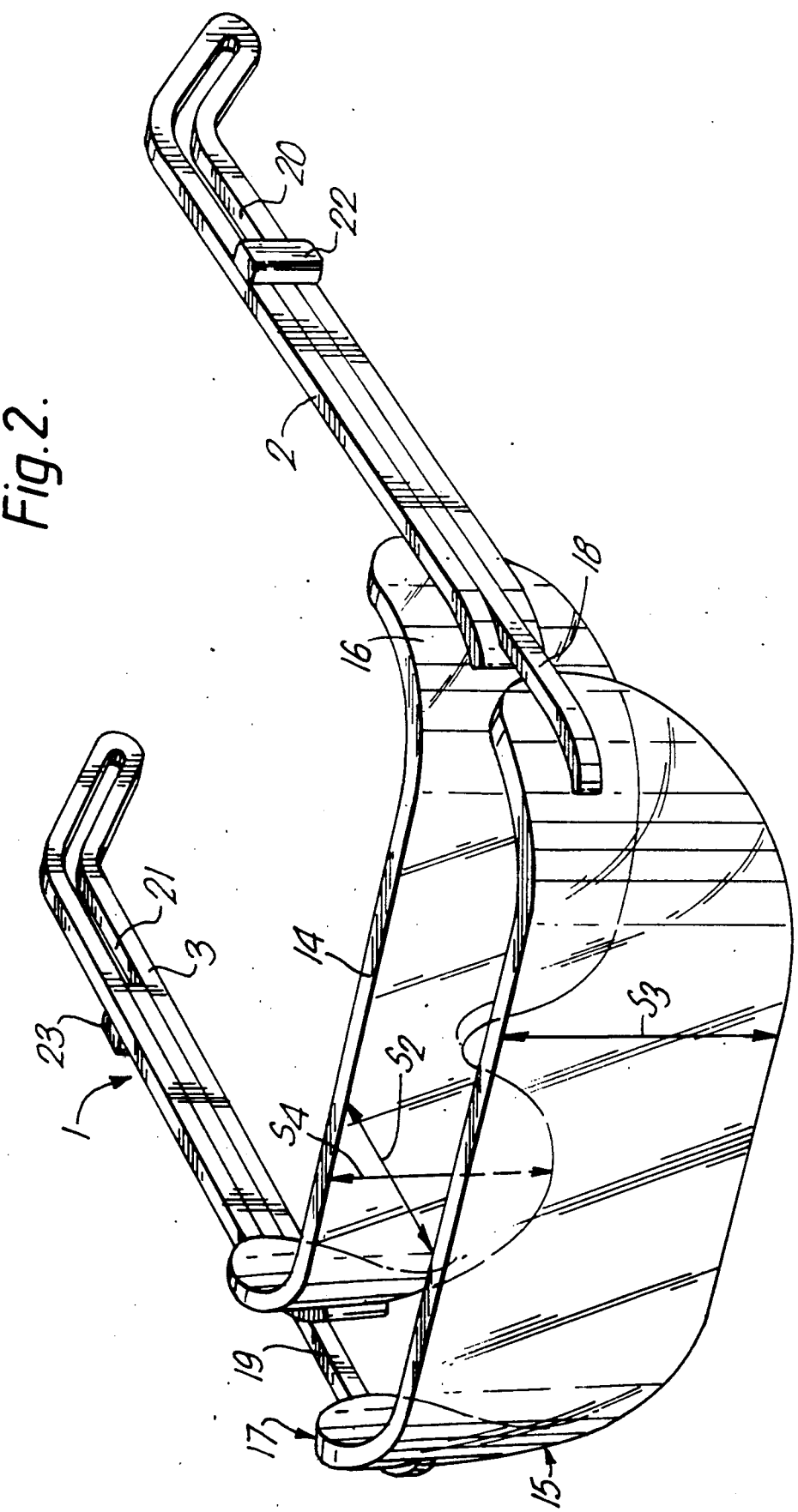
FIG. 2 illustrates a perspective view of a second embodiment in accordance with the invention.

Referring now to FIG. 2, here the binocular eyepieces 4 and 4' of FIG. 1 are replaced by a unitary lens structure 14 and also the binocular objective lenses 5 and 5' of FIG. 1 are replaced by a unitary lens structure 15. Lens units 14 and 15 both have wrap around ends as shown at 16 and 17. Sidepieces 2 and 3 are secured to the part 16 of lens unit 14. Lens unit 15 is carried by sidepieces 18 and 19 which nest into grooves 20 and 21 on the exterior faces of sidepieces 2 and 3. Retaining members 22 and 23 are provided which cooperate with a suitable profiled structure either within the grooves 20 and 21 or ont he face of sidepieces 2 and 3 adjacent to grooves 20 and 21, for example in the manner of audio headphone retaining devices.

Because the embodiment of FIG. 2 has a unitary objective lens construction, there is no need to provide means corresponding to that used to provide lateral movement of binocular lenses 5 and 5' in FIG. 1. The distance $S_2$ between lens units 14 and 15 can be varied by the user by means of retaining members 22 and 23 acting on sidepieces 18 and 19.

In the embodiments of both FIGS. 1 and 2, the dimension marked $S_3$ is greater than that marked $S_4$. In other words, in FIG. 1 the objective lenses 5 and 5' are phsically larger than eyepiece lenses 4 and 4', while in FIG. 2 the objective lens unit 15 is physically larger than eyepiece lens unit 14. The ratio $S_3:S_4$ is advantageously in the range 1:1 to 2.5:1, more preferably in the range 1.2:1 to 2:1.

In one embodiment of the type illustrated in FIG. 1, each eyepiece lens is a planoconcave lens with a diameter of 30 mm and a back focal length of −45.5 mm (concave surface at the rear —i.e. closest to the eye). Each objective lens is biconvex, with a back focal length of 86.6 mm and a diameter of 40 mm. The power of the lenses (dioptres) was: eyepiece lenses: −22; and objective lens: +11.5.

I claim:

1. A device for aiding vision of images in the midrange, typically but not exclusively for magnifying a television picture, which device comprises a pair of spectacles comprising binocular eyepiece lenses mounted in a frame and further comprising binocular objective lenses disposed in front of each eyepiece lens and supported by an extension to the frame of the spectacles; the objective lenses being larger than the eyepiece lens or lenses; the objective lens or lenses being mounted so as to be movable backward and forward along the optical axis; said device including means for tilting said objective lenses with respect to said eyepiece lenses by pivotal motion about a generally horizontal axis; and said binocular lenses being movable laterally.

2. A device for aiding vision of images in the midrange, typically but not exclusively for magnifying a television picture, which device comprises a pair of specticles comprising binocular eyepiece lenses mounted in a frame and further comprising binocular objective lenses disposed in front of each eyepiece lens and supported by an extension to the frame of the spectacles; the objective lenses being larger than the eyepiece lens or lenses; the objective lens or lenses being mounted so as to be movable' backward and forward along the optical axis; said device including means for tilting said objective lenses with respect to said eyepiece lenses by pivotal motion about a generally horizontal axis; and said eyepiece lenses being of unitary construction.

3. A device for aiding vision of images in the midrange, typically but not exclusively for magnifying a television picture, which device comprises a pair of spectacles comprising binocular eyepiece lenses mounted in a frame and further comprising binocular objective lenses disposed in front of each eyepiece lens and supported by an extension to the frame of the spectacles; the objective lenses being larger than the eyepiece lens or lenses; the objective lens or lenses being mounted so as to be movable backward and forward along the optical axis; said device including means for tilting said objective lenses with respect to said eyepiece lenses by pivotal motion about a generally horizontal axis; and each eyepiece and objective lens unit having a wrap-around configuration.

4. A device for aiding vision of images in the midrange, typically but not exclusively for magnifying a television picture, which device comprises a pair of spectacles comprising binocular eyepiece lenses mounted in a frame comprising an eyepiece lens support member and a first pair of side panels; and further comprising binocular objective lenses disposed one in front of each eyepiece lens and supported by an objective lens support member and a second pair of side panels wherein said first and second side panels are arranged to slide against one another so that the objective lenses are continuously movable backward and forward with respect to the eyepiece lenses; said second pair of side panels being extendable to a substantial distance away from said eyepiece lenses and forwardly from said first pair of side panels, to provide a range of adjustment of the distance between said eyepiece lenses and said objective lenses which is at least equal to two centimeters; said first and second side panels being arranged so that one of the side panels slides in a groove defined by the other of said side panels; and including means for providing tilting movement of said objective lenses relative to said eyepiece lenses.

5. A device as claimed in claim 4 wherein the objective lens or lenses are not smaller in physical dimensions than the eyepiece lens or lenses.

6. A device as claimed in claim 4 wherein the objective lens or lenses are larger than the eyepiece lens or lenses.

7. A device as claimed in claim 4 wherein the eyepiece lens or each of the eyepiece lenses are biconcave.

8. A device as claimed in claim 4 wherein the eyepiece lens or each of the eyepiece lenses are plano-concave.

9. A device as claimed in claim 4, wherein objective lens or each of the objective lenses are bi-convex.

10. A device as claimed in claim 4 wherein the objective lens or each of the objective lenses are plano-convex.

11. A device as claimed in claim 4 wherein the eyepiece lens or each of the eyepiece lenses are modified so as to correct defects in the vision of the wearer.

12. A device for aiding vision of images in the midrange, typically but not exclusively for magnifying a television picture, which device comprises a pair of spectacles comprising binocular eyepiece lenses mounted in a frame comprising an eyepiece lens support member and a first pair of side panels; and further comprising binocular objective lenses disposed one in front of each eyepiece lens and supported by an objective lens support member and a second pair of side panels wherein said first and second side panels are arranged to slide against one another so that the objective lenses are continuously movable backward and forward with respect to the eyepiece lenses; said second pair of side panels being extendable to a substantial distance away from said eyepiece lenses and forwardly from said first pair of side panels, to provide a range of adjustment of the distance between said eyepiece lenses and said objective lenses which is at least equal to two centimeters; said first and second side panels being arranged so that one of the side panels slides in a groove defined by the other of said side panels; and said pair of spectacles including a pair of ear piece members secured to one of said side panels, and said ear piece members each including a central groove, and a pair of side pieces secured to said other pair of side panels, and said side pieces being slidably mounted and nested into said grooves to provide adjustment of the spacing between the eyepiece lenses and the objective lenses.

13. A device as claimed in claim 12 wherein the objective lens or lenses are mounted so as to be moveable backward and forward along the optical axis.

14. A device as claimed in claim 12 wherein said eyepiece lenses are of unitary construction.

15. A device as claimed in claim 12 wherein said objective lenses are of unitary construction.

16. A device as claimed in claim 12 wherein at least one of the lens and side panel units has a wrap-around configuration, with a smooth, gradual curvature between the lens are and the side panel of the unit.

17. A device as claimed in claim 12 wherein both the eyepiece lenses and side panel assembly and the objective lenses and side panel assembly have wrap-around configurations, with a smooth, gradual curvature between the lens area and the side panels of each of these assemblies.

* * * * *